(12) United States Patent
Klocke et al.

(10) Patent No.: US 11,065,887 B2
(45) Date of Patent: Jul. 20, 2021

(54) METHOD FOR SAFEGUARING A PRINTING PROCESS USING A PRINTER AND PRINTER FOR IMPLEMENTING THE METHOD

(71) Applicant: PHOENIX CONTACT GMBH & CO. KG, Blomberg (DE)

(72) Inventors: Sandra Klocke, Vlotho (DE); Albrecht Schierholz, Schieder-Schwalenberg (DE); Kilian Klages, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 282 days.

(21) Appl. No.: 15/775,904

(22) PCT Filed: Nov. 11, 2016

(86) PCT No.: PCT/EP2016/077409
§ 371 (c)(1),
(2) Date: May 14, 2018

(87) PCT Pub. No.: WO2017/081235
PCT Pub. Date: May 18, 2017

(65) Prior Publication Data
US 2018/0326749 A1    Nov. 15, 2018

(30) Foreign Application Priority Data

Nov. 13, 2015 (DE) .................... 10 2015 119 641.7

(51) Int. Cl.
*B41J 3/407* (2006.01)
*B41J 11/00* (2006.01)
(Continued)

(52) U.S. Cl.
CPC .......... *B41J 3/4075* (2013.01); *B41J 11/009* (2013.01); *B41J 11/06* (2013.01); *B41J 15/04* (2013.01); *B41J 32/00* (2013.01); *G06K 5/00* (2013.01)

(58) Field of Classification Search
CPC ...................................................... B41J 11/009
(Continued)

(56) References Cited

U.S. PATENT DOCUMENTS 4,910,602 A * 3/1990 Sakuragi .................. B41J 17/22
                                                      347/215
5,248,207 A * 9/1993 Yamamoto ............... B41J 17/32
                                                     400/120.16

(Continued)

FOREIGN PATENT DOCUMENTS

| CN | 102632721 A | 8/2012 |
|----|----|----|
| DE | 203 13 856 U1 | 2/2005 |
| DE | 10 2007 036 374 A1 | 2/2009 |

*Primary Examiner* — Anthony H Nguyen
(74) *Attorney, Agent, or Firm* — David S. Safran; Roberts Calderon Safran & Cole, P.C.

(57) ABSTRACT

A method for securing a printing process of a printer having a housing with a printing chamber, a printing device, a holding device for an exchangeable magazine for holding an object to be printed on, a control and evaluation unit, and a memory, the method having the following steps: inserting a magazine having the object to be printed into the holding device; moving the holding device into the printing chamber, using an optical sensor in the housing to sense a marking on the magazine; performing a comparison of the marking on the inserted magazine sensed by the sensor with a marking stored in memory in the control and evaluation unit for a magazine permissible for the print object to be printed on; outputting an error indication if the marking of the inserted magazine sensed by the sensor does not match the marking stored in the memory for a permissible magazine.

7 Claims, 7 Drawing Sheets

(51) Int. Cl.
  *B41J 11/06*   (2006.01)
  *B41J 15/04*   (2006.01)
  *B41J 32/00*   (2006.01)
  *G06K 5/00*    (2006.01)

(58) Field of Classification Search
  USPC .......................................................... 400/48
  See application file for complete search history.

(56) References Cited

U.S. PATENT DOCUMENTS

| | | | | |
|---|---|---|---|---|
| 5,287,124 | A * | 2/1994 | Fukahori | B41J 2/32 |
| | | | | 347/178 |
| 5,393,149 | A * | 2/1995 | Iima | B41J 17/36 |
| | | | | 400/208 |
| 5,755,519 | A * | 5/1998 | Klinefelter | B41J 17/36 |
| | | | | 400/249 |
| 7,037,011 | B1 * | 5/2006 | Forest | B41J 32/00 |
| | | | | 101/93.04 |
| 9,053,396 | B2 | 6/2015 | Schierholz | |
| 2003/0044210 | A1 * | 3/2003 | Mindler | B41J 11/009 |
| | | | | 400/1 |
| 2004/0009021 | A1 * | 1/2004 | Miyauchi | B41J 3/4071 |
| | | | | 400/55 |
| 2004/0240894 | A1 * | 12/2004 | Tomita | G03G 15/5062 |
| | | | | 399/17 |
| 2004/0265027 | A1 * | 12/2004 | Hine | B41J 3/46 |
| | | | | 400/76 |
| 2015/0034715 | A1 * | 2/2015 | Moriyama | B41J 11/46 |
| | | | | 235/375 |
| 2017/0210140 | A1 * | 7/2017 | Klocke | B41J 2/325 |

\* cited by examiner

METHOD FOR SAFEGUARING A PRINTING PROCESS USING A PRINTER AND PRINTER FOR IMPLEMENTING THE METHOD

BACKGROUND OF THE INVENTION

Field of the Invention

The invention relates to a method for safeguarding a printing process using a printer, the printer having a housing with a print space made within the housing, a printing device, a receiving device for an interchangeable magazine which is used to accommodate the print object to be printed upon, a control and evaluation unit, and a memory. In addition, the invention relates to a corresponding printer for implementing the method.

Description of Related Art

In industrial and commercial practice, to identify and label machines, devices, terminals, cables or leads, different types of identification and marking labels are used on which information with respect to the components to which they are assigned is applied. For this purpose the identification or marking labels are conventionally provided in a printer with a corresponding print pattern, generally alphanumeric characters. Different printers with different printing methods, for example inkjet printers, thermal transfer printers or UV printers, are used for marking. These marking printers are known for example from the catalog "Markierungssysteme Werkzeuge Montagematerial [Marking Systems, Tools, Assembly Material] 2013/2014", pages 28 to 37 of Phoenix Contact GmbH & Co. KG.

In practice, print objects in card format which have a host of individual marking labels are often used. The print objects which are also often called markers are made in particular as plastic injection moldings or as plastic stamped parts. In plastic injection moldings which are also called Universal Card Material (UniCard or UC material), the marking labels are attached via ties in an outer frame. After printing upon, the individual marking labels which are often used for marking of leads and cables or for terminal marking are parted from the frame. In plastic stamped parts which are also called Universal Sheet Material (UniSheet or US material) several rows of marking labels together form a marker, and after printing upon the US material the individual marking labels can be separated from one another.

Moreover, several identification or marking labels can also be applied, in particular can be cemented, on a common carrier sheet, from which the individual identification or marking labels can be easily removed after marking. These carrier sheets are often also called lettering sheets or label sheets in practice.

The different kinds of markers are generally called print objects in the following, the print objects consisting of different materials, in particular different plastics, and they can have different dimensions, in particular different material thicknesses. In order to be able to print upon the different print objects with their different dimensions by a printer, the individual print objects in this method or in the printer under consideration are inserted into a magazine which fits the print object. If all magazines have the same outside dimensions, any magazine can be inserted into the receiving device of the printer, which device can be moved in the manner of a drawer between a loading and unloading position outside the print space and a printing position within the print space.

Thermal transfer printers have turned out to be especially suitable for printing upon these print objects. In thermal transfer printing a special film which is coated with a temperature-sensitive ink is guided through between the print object and a thermal printing head as a printing device, the film as an ink ribbon being located in a corresponding printer cassette. With thermal transfer printing an exact ink imprint and high print quality can be produced with high luster. But for this purpose it is necessary for the print parameters, such as temperature, printing speed, material and thickness of the print object and of the ink ribbon to be exactly matched to one another.

Since in the printer under consideration which is preferably a thermal transfer printer, a host of different print objects, as a result also a plurality of different magazines and moreover also even several different printer cassettes with different ink ribbons can be used, in spite of corresponding labelling of the individual components, there is the risk that the user is using the printer with components which are not matched correspondingly to one another.

German Patent Application DE 10 2010 037 564 A1 and corresponding U.S. Pat. No. 9,053,396 B2 disclose a print object for a thermal transfer printer in which the print object as identification has a bar code identification with a host of successive individual lines, the identification being detected by an optical sensor which is located in the printer. When using the print objects known from DE 10 2010 037 564 A1 and corresponding U.S. Pat. No. 9,053,396 B2, it can thus be ensured that the actual printing process is only carried out when the user has inserted the correct print object into the printer. Nevertheless, it has been found in practice that in individual cases printing upon the print objects with unsatisfactory printing quality occurs although correspondingly identified print objects have been used.

SUMMARY OF THE INVENTION

Therefore, the object of this invention is to devise a method which was described at the beginning for safeguarding of a printing process using a printer, in particular a thermal transfer printer, in which it is easily and reliably ensured that the printing upon the chosen print object takes place in the desired high quality. Thus reliable safeguarding will take place by which the printing upon a print object having poor quality will be prevented. Moreover, the object of the invention is to make available a corresponding printer for implementing the method.

The object is achieved in the method in accordance with the invention with by the method, first of all, having the following steps:

Insertion of a magazine with the print object to be printed upon into the receiving device, the receiving device being located in a loading and unloading position outside the print space.

Running of the receiving device into the print space, one optical sensor which is located in the housing detecting an identification which is located on the magazine.

Comparison of the identification of the inserted magazine which has been detected by the sensor to an identification stored in the memory for a magazine which is allowable for the print object to be printed upon in the control and evaluation unit.

Output of an error message when the identification of the inserted magazine which has been detected by the sensor does not agree with the identification stored in the memory for an allowable magazine.

In accordance with the invention, it has been ascertained that the quality of the print pattern which has been printed on the print object not only depends on the print object for which the suitable print parameters such as printing temperature and printing speed are currently present or have been set in the printer in fact being inserted in the printer. Surprisingly, it has been ascertained here that the print quality also depends on there being a magazine in the receiving device which is explicitly intended for the print object which is to be printed upon.

Since the individual print objects have in part different dimension, contact areas which are adapted to the different print objects are made in the individual magazines. Therefore, it seems surprising that an incorrect assignment of the print object and the magazine is possible at all. But it has been found within the scope of this invention that for a correspondingly large number of different print objects and a plurality of different magazines it can nevertheless happen that individual print objects can be mechanically inserted by the user into individual magazines which are not intended for use with these print objects. This can be due for example to the dimensions of the contact area made in the magazine differing only slightly from the dimension of the inserted print object so that the print object is being incorrectly inserted into the magazine by the user.

If the dimension of the contact area made in the magazine is slightly larger than the dimension of the inserted print object, slipping or smaller movements of the print object in the selected magazine can occur with vibrations; this adversely affects the print quality. It can likewise happen that the depth of the contact area in the magazine is not matched exactly to the material thickness of the print object so that in the printing process the distance between the print object and the printing device, in particular the thermal printing head of a thermal transfer printer, does not correspond to the actually intended optimum distance. This can also lead to degraded print quality, in part even to misprinting on the print object.

Because in the method in accordance with the invention it is automatically checked whether there is a magazine which is intended for the print object to be printed upon and which is thus allowable in the receiving device, a print object in poorer print quality can be prevented from being printed upon because the user has unintentionally inserted a magazine which is not intended for the selected print object into the receiving device.

By using an optical sensor, in particular, a reflex light scanner, an identification which is located on the magazine or has been attached accordingly to it can be easily and economically detected. The identification is preferably a bar code identification, consisting of several individual lines. If the extension of the bar code identification is parallel to the direction in which the receiving device is moving, to detect such a bar code identification a single optical sensor which is located securely in the housing is sufficient since then when the receiving device is being run out of the loading and unloading position into the print space the bar code identification is moved past the optical sensor.

The identification which has been detected in this way by the sensor on the magazine and which corresponds to a code assigned to the magazine is then compared in the control and evaluation unit to identifications which have been filed in the memory and which are assigned to magazines which are intended and thus suitable for the print object to be printed upon. If the comparison undertaken in the control and evaluation unit results in the identification of the inserted magazine which has been detected by the sensor not agreeing with the identifications filed in the memory for an allowable magazine, a corresponding error message is output.

The error message can be, for example, the flashing of a corresponding display or an alarm tone. According to one preferred configuration of the method in accordance with the invention, it is provided that the initialization of the printing process is continued when the comparison of the identification of the inserted magazine detected by the sensor to the identification stored in the memory which has been carried out in the evaluation unit does not yield any difference. A desired printing process is thus automatically started by for example the print data and print parameters which are necessary for printing being set when it has been ascertained by the control and evaluation unit that a magazine which fits the selected print object has been inserted in the receiving device.

According to one advantageous configuration of the method in accordance with the invention, not only does automatic checking of the inserted magazine take place, but also automatic checking of the print object which has been inserted in this magazine. To do this, an identification located on the print object when the receiving device is being run into the print space is detected by an optical sensor which is located in the housing. Then, a corresponding comparison of the identification of the inserted print object which has been detected by the sensor to an identification stored in the memory for the print object to be printed upon is carried out in the control and evaluation unit, as is the output of an error message when the identification of the inserted print object which has been detected by the sensor does not agree with the identification filed in the memory for the print object which is to be printed upon.

According to another preferred configuration of the method in accordance with the invention, as a result, the printer cassette which has been inserted into the printer is moreover also checked for whether it is a printer cassette which is suitable for the selected print object and is thus allowable. After inserting an interchangeable printer cassette which has a corresponding identification into the housing of the printer, the identification of the printer cassette is detected by means of at least one other optical sensor which is located in the housing. Then, a corresponding comparison of the identification of the inserted printer cassette which has been detected by at least one optical sensor to an identification filed in the memory for a printer cassette which is allowable for the print object to be printed upon takes place in the control and evaluation unit. Then, an error message is output when the identification of the inserted printer cassette which has been detected by the sensor does not agree with the identification stored in the memory for an allowable printer cassette.

In the method in accordance with the invention, if—according to the preferred configuration—automatic checking of the inserted magazine, of the inserted print object and of the inserted printer cassette takes place, automatic checking whether all components which are necessary for the printing process and which must be chosen and inserted by the user are allowable for the printing process which is to be carried out thus takes place. In this way it is not only checked whether the user has correctly chosen an individual component to be inserted, for example, the print object, but it is automatically checked whether the combination of individual components which has been selected by the user is allowable. In this way the printing process is safeguarded which prevents a print object from being printed upon although the components which have been inserted into the printer by the user are not matched to one another; this can lead to printing with diminished quality.

To carry out the printing process, after positioning the print object to be printed upon and after input of the information to be printed, the print data and print parameters necessary for the printing process are made available by the software which controls the printing process. According to one preferred configuration of the method, after positioning the print object to be printed upon the identification of the print object and the identification of the magazines and printer cassettes which are allowable for the print object are stored in the memory. After inserting the printer cassette into the printer and inserting a magazine with the print object to be printed upon into the receiving device and running the receiving device into the print space, then the identifications of the components used—magazine, print object, printer cassette—which have been detected by the respective sensors can be compared in the evaluation unit to the corresponding identifications which are stored in the memory.

As has already been stated above, in the method in accordance with the invention an error message is output when an identification which has bene detected by a sensor does not agree with the corresponding identification stored in the memory. The error message is preferably a corresponding indication in a printer display. To continue the printing process, it can be provided that the error message must be actively acknowledged by the user, further execution of the printing process is thus interrupted until the user has acknowledged the error message and has corrected the error.

Moreover, as a further method step it can also be provided that when a difference has been ascertained in the comparison of the identifications which has been carried out in the evaluation unit, the receiving device travels out of the print space into the loading and unloading position outside the print space. The user can then directly remove the objectionable magazine or the objectionable print object and replace them by an allowable magazine or the correct print object. Here, it is in particular advantageous if the user is notified by a corresponding error message which components—magazine and/or print object—need to be replaced.

The initially named object is achieved in a printer for executing the method in accordance with the invention which has a housing, with a print space made within the housing, a printing device, a receiving device, a control and evaluation unit, and a memory. The receiving device is used to accommodate an interchangeable magazine in which the print object to be printed upon is located, the receiving device being movable between a loading and unloading position outside the print space and a printing position within the print space.

In accordance with the invention, in the housing, there is at least one optical sensor for detecting an identification located on a magazine so that the identification can be detected by the sensor when the magazine which has been inserted in the receiving device runs into the print space out of the loading and unloading position outside the print space. The control and evaluation unit of the printer is made to compare the magazine identification which has been detected by the sensor or to an identification stored in the memory for a magazine which is intended for the print object to be printed upon and is thus allowable. Moreover, the control and evaluation unit initiates an error message when the completed comparison yields a difference between the detected identification and the stored identification. With respect to the advantages of the printer which is made in accordance with the invention and which is preferably a thermal transfer printer, reference is made to the previous details in conjunction with the method in accordance with the invention.

According to one preferred configuration of the printer in accordance with the invention, in the housing, there is at least one further optical sensor for detecting an identification located on the print object. Since the print object together with the magazine is located in the receiving device, the use of a single optical sensor for detecting the identification of the print object is sufficient since the print object moves past the optical sensor when the receiving device is being run into the printing position within the print space in a corresponding arrangement of the optical sensor.

Fundamentally, the use of a single optical sensor both for detecting the identification of the print object and also for detecting the identification of the magazine is sufficient if the identification on the print object and on the magazine are arranged to one another such that they pass the optical sensor in succession when the transport carriage is being run in. According to one alternative preferred configuration of the printer in accordance with the invention, to detect the identification on the magazine and to detect the identification on the print object there are however two optical sensors which are preferably arranged within the housing to one another such that their optical axes run essentially perpendicular to one another. If the direction in which the receiving device is moving runs horizontally, this means that the optical axis of one sensor is likewise aligned horizontally while the optical axis of the other sensor runs vertically.

In one especially preferred configuration, in the housing of the printer there is moreover at least one further optical sensor for detecting an identification which is located on an interchangeable printer cassette. Then in the evaluation unit the identification of the inserted printer cassette which has been detected by the sensor is compared to an identification stored in the memory for a printer cassette which is suitable for the print object to be printed upon. If the identification according to one advantageous configuration is a bar code identification which results from several individual lines located next to one another, the bar code identification can be recognized using an optical sensor by the optical sensor being movably located within the printer housing. The direction in which the sensor moves must then correspond to the direction of extension of the bar code identification. Thus it is taken into account that the printer cassette, in contrast to the magazine which has been inserted in the receiving device and to the print object, is located stationary in the housing, thus is not moving past a stationary sensor.

But preferably, instead of a moveable optical sensor, several optical sensors are used which are arranged next to one another in the housing, the arrangement of the sensors corresponding to the extension of the identification, in particular to the arrangement of the individual lines of a bar code identification. If the bar code identification has for example six individual lines which are located next to one another, there are also then six optical sensors located next to one another in the housing, each individual line being located within the detection range of one optical sensor when the printer cassette is arranged correctly in the housing.

The individual identifications which are located on the components which are to be inserted by a user are preferably made bar code identifications. The individual bar code identifications have several individual lines which are located in succession and which each have a predetermined longitudinal extension and width. Typically, there are two types of individual lines, specifically on the one hand bright, in particular white individual lines, and on the other hand dark, in particular individual black lines so that the contrast between the two types of individual lines is maximum. The individual marks can then be especially easily detected by a reflex light scanner as an optical sensor.

In particular, at this point there are a host of possibilities for configuring and developing the method in accordance with the invention as well as the printer in accordance with the invention as will become apparent from the following description of preferred exemplary embodiments in conjunction with the drawings.

DETAILED DESCRIPTION OF THE INVENTION

Figure 1A:
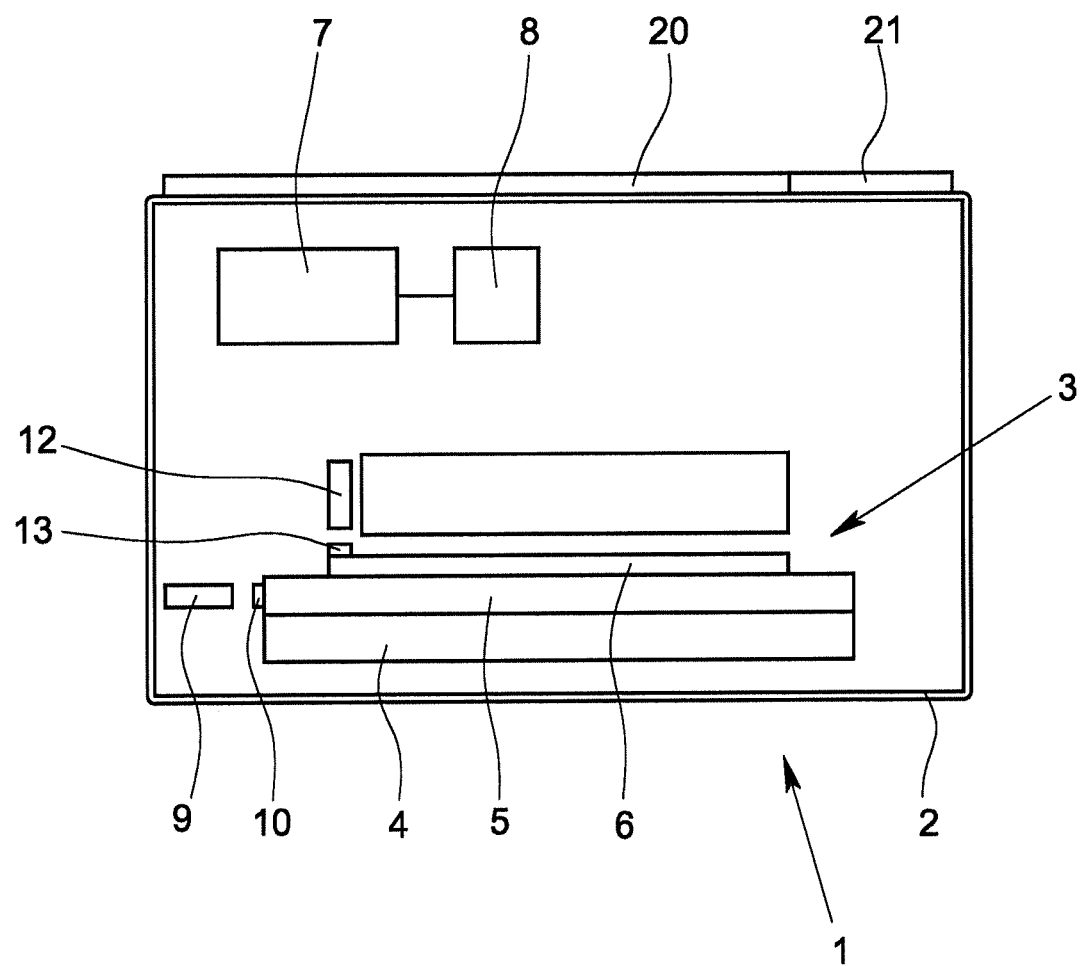
FIGS. 1a & 1b are schematic views of a printer in transvers and longitudinal cross section, respectively.
Figure 1B:
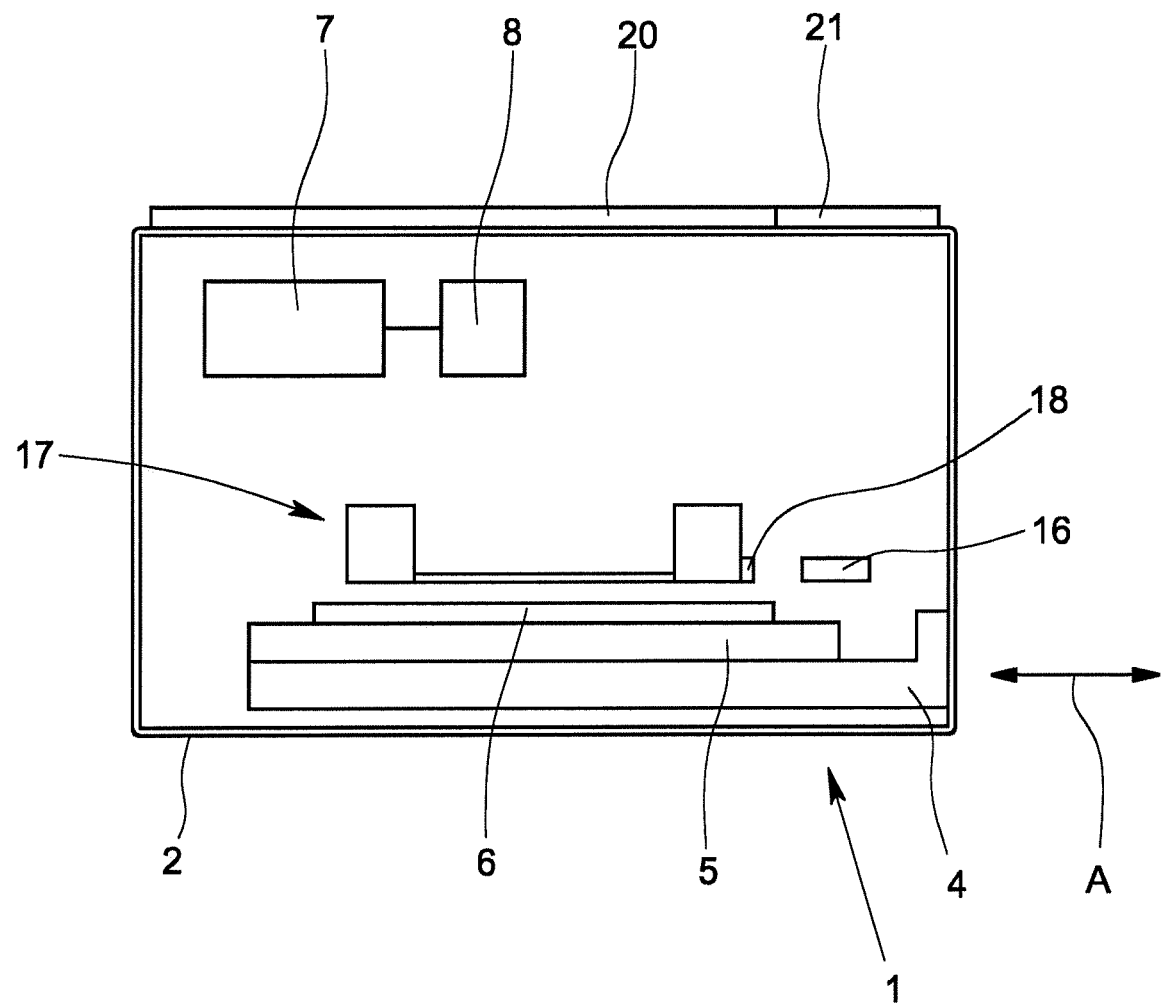

FIG. 1 shows a printer 1 according to this invention in a schematic cross section (FIG. 1a) and in a longitudinal section (FIG. 1b). The printer 1 is used to carry out the method in accordance with the invention, the printer 1 being preferably a thermal transfer printer. The printer 1 has a housing 2 in which a print space 3 is located. A receiving device 4 which is made in the manner of a drawer or transport carriage can be moved between a loading and unloading position outside the print space 3 and a printing position within the print space 3. The direction in which the receiving device 4 moves runs in FIG. 1a in the plane of the drawing and in FIG. 1b in the direction of the arrow A, in the two drawings according to FIG. 1 the receiving device 4 being located within the print space 3, therefore in the printing position.

The receiving device 4 is used to accommodate a magazine 5 into which the object to be printed upon (print object) 6 can be inserted. This ensures that the print object 6 to be printed upon can be easily and conveniently introduced into the print space 3, and moreover, is also always located there in a given position. So that different print objects 6 can be printed upon using the printer 1, the receiving device 4 is made to accommodate an interchangeable magazine 5 into which the print object 6 can be inserted. If a certain print object 6 is to be printed upon, it is inserted into a magazine 5 which is designed for the print object 6 and the magazine 5 with the print object 6 is inserted into the receiving device 4, for which the latter is in its loading and unloading position outside the print space 3. Of course, the magazine 5 can also be equally well inserted first into the receiving device 4 and then the print object 6 can be inserted into the magazine 5.

To control the printing process, the printer 1 has a control and evaluation unit 7 and a memory 8 which is connected to the control and evaluation unit 7, both of which are shown only schematically in FIGS. 1a & 1b. The control and evaluation unit 7 can also be made in particular for communication with an external computer so that the print data and print parameters which are required for executing a printing process can be transferred to the printer 1 or the control and evaluation unit 7 from the external computer as a print data stream.

Figure 2:
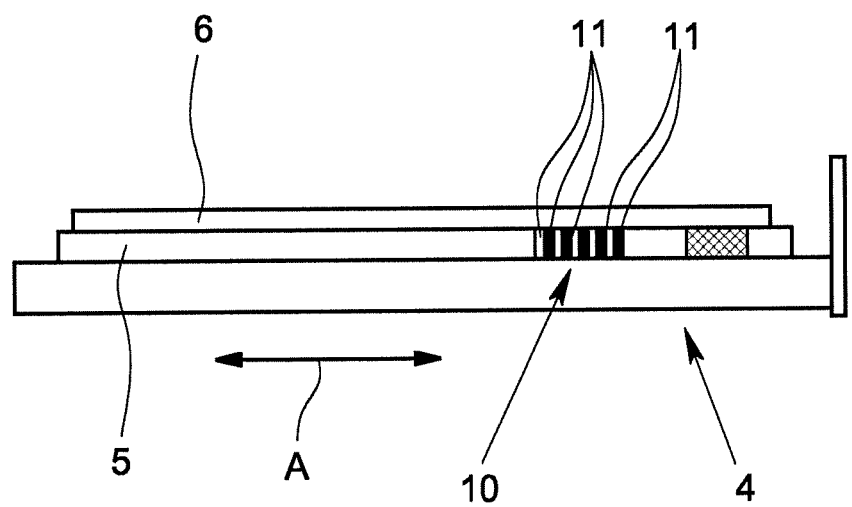
FIG. 2 is a schematic side view of a receiving device of the printer.

As is apparent from FIG. 1a, in the housing 2 of the printer 1, there is an optical sensor 9 which is used to detect an identification 10 which is attached to the magazine 5. The identification 10 according to FIG. 2 can preferably be a bar code identification so that the reflex light scanner can be used as the optical sensor 9. Because the optical axis of the optical sensor 9 is aligned perpendicular to the direction A in which the receiving device 4 is moving, the bar code identification 10 located on the magazine 5 is routed past the sensor 9 when the receiving device 4 is moving out of the loading and unloading position into the printing position within the print space 3. In this way, it is sufficient to use only one optical sensor 9 for detection of the bar code identification 10 which is comprised of several individual lines 11 which are arranged in succession.

Moreover, the printer 1 has another optical sensor 12 for detecting an identification 13 which is located on the print object 6. Since the longitudinal extension of the identification 13 of the print object 6 also extends parallel to the direction A in which the receiving device 4 moves, the identification 13 can also be detected using a stationary sensor 12 whose optical axis is aligned perpendicular to the direction A in which the receiving device 4 is moving. The optical sensor 9 for detecting the identification 10 of the magazine 5 and the optical sensor 12 for detecting the identification 13 of the print object 6 are arranged in the housing 2 of the printer 1 such that their optical axes run perpendicular to one another. As is apparent from FIG. 1a, for this reason, the identification 10 is located on a lateral surface of the magazine 5, while the identification 13 of the print object 6 is attached on or in its top surface.

Figure 3:
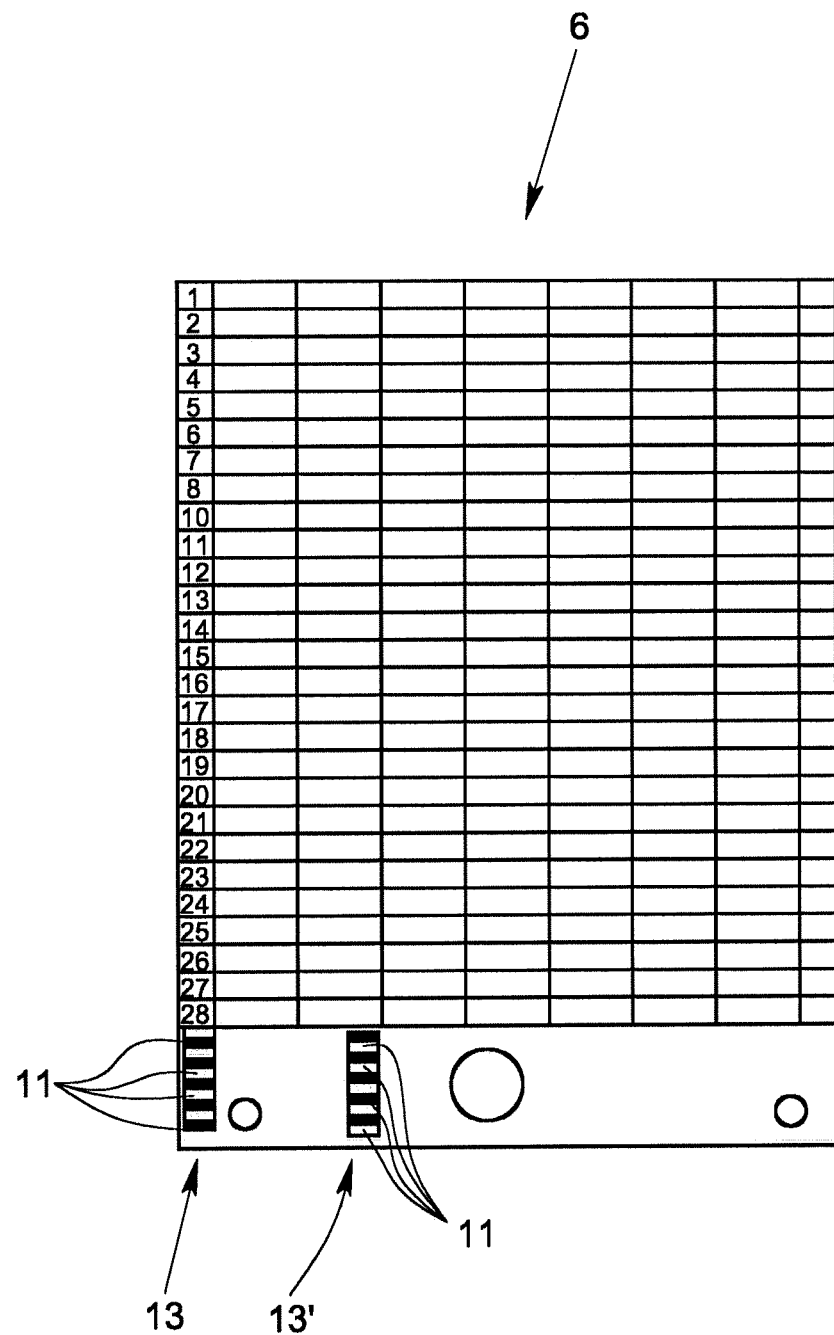
FIG. 3 shows a first preferred exemplary embodiment of a print object.

The identification 13 of the print object 6 can likewise be made as a bar code identification, as is the case in the exemplary embodiment according to FIG. 3. Here, a US material is shown as the print object 6 in which there is moreover a second identification 13' which is located parallel to the first identification 13 on the print object 6, the two bar code identifications 13, 13' being arranged turned by 180° to one another. There are then two optical sensors 12 next to one another for simultaneous redundant detection of the two bar code identifications 13, 13' in the housing 2 of the printer 1.

Figure 4:
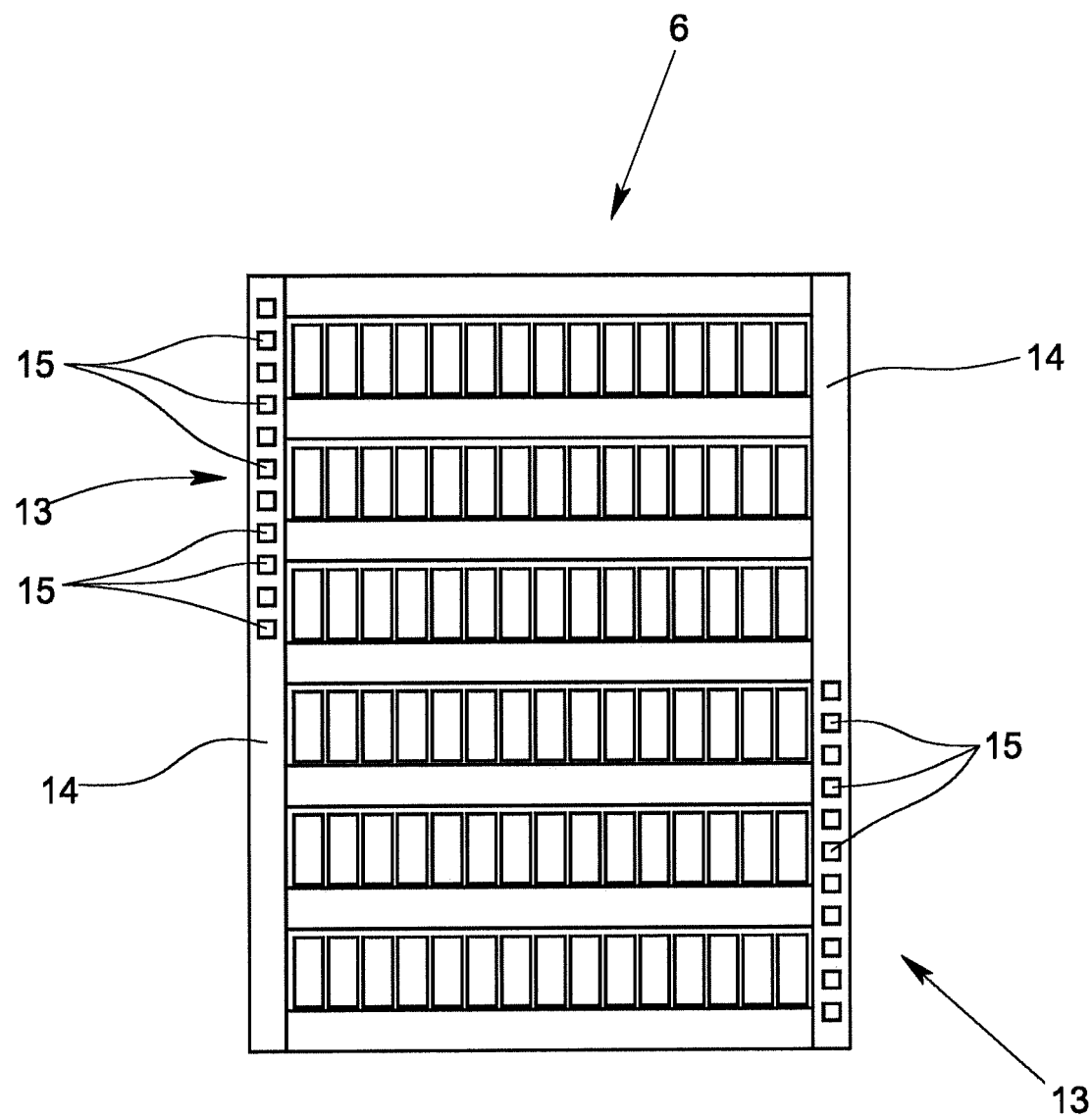
FIG. 4 shows a second exemplary embodiment of a print object.

In the exemplary embodiment of the print object 6 according to FIG. 4, which shows a Universal card material (UC material), the identification 13 is made as a pattern of holes, i.e., free holes 15 are provided at given positions in the edge region 14 of the print object 6. In an identification 13 which is made as a pattern of holes, the optical sensor 12 is preferably a photoelectric barrier so that it can be ascertained by means of the photoelectric barrier whether a hole 15 is made or not at given positions. If a hole 15 is made at a given position, a light beam which has been emitted from the transmitter of the photoelectric barrier travels through the hole 15 to the opposite receiver of the photoelectric barrier. Conversely, if a hole 15 is not made at a given position, the light beam which has been emitted by the transmitter is interrupted by the material of the edge region 14 of the print object 6 so that it does not reach the opposite receiver of the photoelectric barrier.

Figure 5:
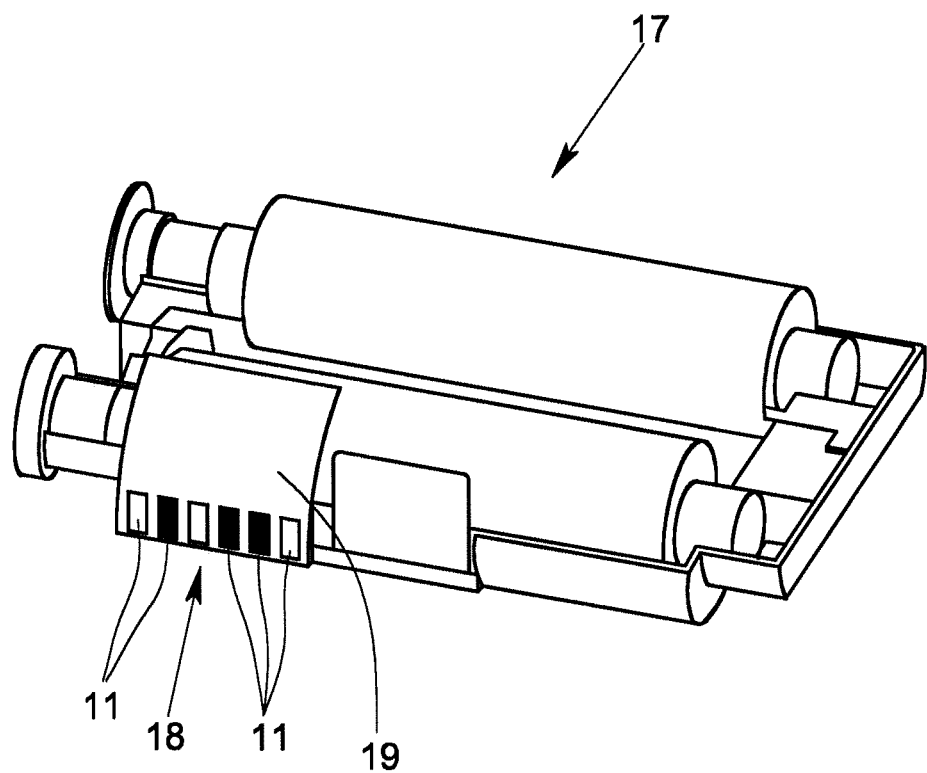
FIG. 5 is a perspective of a printer cassette.

In the preferred configuration of the printer 1 in accordance with the invention, in addition to the sensor 9 for the magazine 5 and the sensor 12 for the print object 6, there are several other sensors 16 for recognizing an identification 18 attached to the interchangeable printer cassette 17. Since a printer cassette 17 which has been inserted into the housing 2 of the printer 1 is located stationary there, therefore does not move with the receiving device 4, to recognize the identification 18 of the printer cassette 17 which is made likewise as a bar code, there are several optical sensors 16 in the longitudinal extension of the identification 18 next to one another in the housing 2. The optical sensors 16 which in FIG. 1b are located in succession in the plane of the drawing, are used for detection of one individual line 11 of the bar code identification 18 of the printer cassette 17. As can be recognized from FIG. 5, the identification 18 of the printer cassette 17 can be easily applied on a label 19 which is cemented at a given position on the printer cassette 17. Then in addition the article designation, the article number and optionally a logo can preferably be applied on the label 19.

Figure 6:
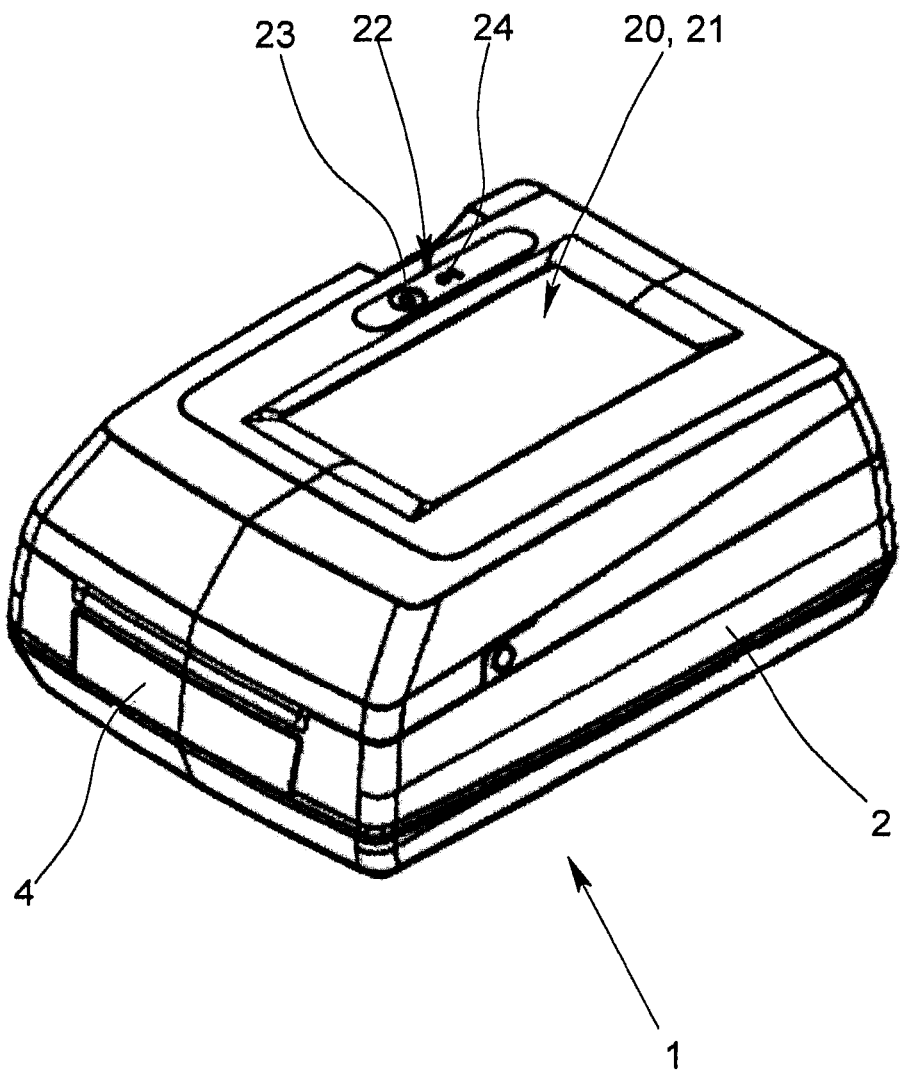
FIG. 6 is a perspective of an exemplary embodiment of a printer.

FIG. 6 shows a perspective of one preferred configuration of a printer 1 in accordance with the invention as a thermal transfer printer. The printer 1 is made here as a portable device which due to its low weight of less than 10 kg and its small base which corresponds roughly to the dimensions of one DIN A4 sheet, can be placed by the user if necessary at different utilization sites. To carry out the desired print job the printer 1 on its top has a display 20 and a keyboard 21 with which the identification of the print object 6 to be printed upon and optionally the print data can be input. Instead of a display 20 and a separate keyboard 21, the printer 1 preferably has a touch screen which performs the function of display and keyboard.

It is moreover apparent from the perspective view of the printer 1 in FIG. 6 that in addition to the touch screen there is another control panel 22 in which in addition to an on/off switch 23 there is also a key 24 for running the receiving device 4 in. The method in accordance with the invention can thus be started by the key 24 being pressed after inserting the magazine 5 with the print object 6 into the receiving device 4 so that the receiving device 4 travels into the print space 3 in the housing 2.

What is claimed is:

1. A method for safeguarding a printing process using a printer having a housing, a print space within the housing, a printing device, a receiving device for an interchangeable magazine for accommodating a print object to be printed upon, a control and evaluation unit having a memory in which is stored an identification of a magazine which is allowable for the print object to be printed upon and in which is stored an identification for an allowable print object, comprising the following steps:
   inserting a magazine with the print object to be printed upon into the receiving device in a loading and unloading position outside of the print space,
   during running of the receiving device into the print space, using an optical sensor located in the housing for detecting an identification located on the magazine and which identifies the magazine,
   comparing the detected identification on the inserted magazine to an identification stored in the memory for a magazine which is allowable for the print object to be printed upon,
   outputting an error message when the detected identification of the inserted magazine does not agree with the identification stored in the memory for an allowable magazine.

2. The method as claimed in claim 1, comprising the further steps of:
   detecting an identification which is located on the print object by means of a second optical sensor which is located in the housing when the receiving device is being inserted into the print space,
   comparing the identification on an inserted print object which has been detected by the second optical sensor to an identification stored in the memory for the print object which is to be printed upon,
   outputting of an error message when the identification of the inserted print object which has been detected by the second optical sensor does not agree with the identification stored in the memory of the control and evaluation unit for the print object which is to be printed upon.

3. The method as claimed in claim 1, comprising the following further steps:
   inserting of an interchangeable printer cassette into the housing which has an identification located on the printer cassette,
   detecting the identification on the printer cassette by means of at least one optical sensor which is located in the housing,
   comparing the identification of the inserted printer cassette which has been detected by the at least one optical sensor to an identification stored in the memory of the control and evaluation unit for a printer cassette which is allowable for the print object which is to be printed upon in, and
   outputting an error message when the identification on the inserted printer cassette which has been detected by the at least one sensor does not agree with the identification stored in the memory for an allowable printer cassette.

4. The method as claimed in claim 1, comprising the further steps of:
   detecting an identification which is located on the print object by means of a second optical sensor which is located in the housing when the receiving device is being inserted into the print space,
   comparing the identification on an inserted print object which has been detected by the optical sensor to an identification stored in the memory for the print object which is to be printed upon,
   outputting of an error message when the identification of the inserted print object which has been detected by the second optical sensor does not agree with the identification stored in the memory of the control and evaluation unit for the print object which is to be printed upon,
   inserting of an interchangeable printer cassette into the housing which has an identifier located on the printer cassette,
   detecting the identifier on the printer cassette by means of at least one optical sensor which is located in the housing,
   comparing the identifier on the inserted printer cassette which has been detected by the at least one optical sensor to an identifier stored in the memory of the control and evaluation unit for a printer cassette which is allowable for the print object which is to be printed upon in, and
   outputting an error message when the identifier on the inserted printer cassette which has been detected by the at least one sensor does not agree with the identifier stored in the memory for an allowable printer cassette.

5. The method as claimed in claim 4, wherein, in the absence of an error message being output, continuing initialization of the printing process by the control and evaluation unit is continued.

6. The method as claimed in claim 2, wherein the receiving device is moved out of the print space back into the loading and unloading position outside of the print space when at least one of the identification of the inserted magazine which has been detected by the optical sensor does not agree with the identification stored in the memory for an allowable magazine or the identification of the an inserted print object which has been detected by the second optical sensor does not agree with the identification stored in the memory for an allowable print object which is to be printed upon.

7. The method as claimed in claim 4, wherein after positioning the identification of the print object on the print object and of the printer cassette on the printer cassette, the identification of the magazine which is allowable for the print object and of the printer cassette that is allowable for the print object are stored in the memory.

\* \* \* \* \*